US008085906B2

(12) United States Patent
Park et al.

(10) Patent No.: US 8,085,906 B2
(45) Date of Patent: *Dec. 27, 2011

(54) METHOD, SYSTEM AND APPARATUS FOR PROVIDING ALTERNATIVE MULTIMEDIA RING BACK TONE SUBSTITUTE SERVICE BY USING INTELLIGENT NETWORK

(75) Inventors: Seongsoo Park, Seoul (KR); Daesic Woo, Seoul (KR); Seongkeun Kim, Seoul (KR); Donghahk Lee, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 748 days.

This patent is subject to a terminal disclaimer.

(21) Appl. No.: 12/162,567

(22) PCT Filed: Sep. 1, 2006

(86) PCT No.: PCT/KR2006/003476
§ 371 (c)(1),
(2), (4) Date: Jul. 29, 2008

(87) PCT Pub. No.: WO2007/089064
PCT Pub. Date: Aug. 9, 2007

(65) Prior Publication Data
US 2009/0196403 A1   Aug. 6, 2009

(30) Foreign Application Priority Data
Jan. 31, 2006  (KR) .................. 10-2006-0009337

(51) Int. Cl.
*H04M 1/64* (2006.01)
*H04M 3/42* (2006.01)
*H04L 12/16* (2006.01)

(52) U.S. Cl. .... 379/87; 370/259; 379/1.01; 379/114.01; 379/142.01; 379/207.16; 379/373.01; 455/401; 455/412.2; 455/414.1; 455/466; 455/567

(58) Field of Classification Search .................... 379/87, 379/114.01, 1.01, 373.01, 142.01; 455/401, 455/466, 502, 567, 412.2, 414.1; 370/259
See application file for complete search history.

(56) References Cited

U.S. PATENT DOCUMENTS
5,579,379 A * 11/1996 D'Amico et al. ........ 379/114.01
(Continued)

FOREIGN PATENT DOCUMENTS
KR    2006003548 A    1/2006
(Continued)

OTHER PUBLICATIONS
International Search Report mailed Dec. 15, 2006 for PCT/KR2006/003476.

*Primary Examiner* — Gerald Gauthier
(74) *Attorney, Agent, or Firm* — Lowe Hauptman Ham & Berner LLP

(57) ABSTRACT

Disclosed is a method, a system, and an apparatus for providing a sound source, which has been encoded by using an audio codec, as a ringback tone alternative having an improved quality by adaptively applying various audio codecs according to the service type so that, when a mobile communication terminal is provided with a ringback tone alternative by separately applying an audio codec and a voice codec to a ringback tone provision section and a voice communication section, respectively, it is unnecessary to individually and additionally change or modify a number of devices in a mobile communication network, but a specific device in an intelligent network controls other devices based on overall consideration of the ability of the mobile communication terminal, the type of the ringback tone alternative, etc.

23 Claims, 3 Drawing Sheets

U.S. PATENT DOCUMENTS

| | | | |
|---|---|---|---|
| 7,233,658 B2 * | 6/2007 | Koser et al. | 379/373.01 |
| 7,515,898 B2 * | 4/2009 | Chin et al. | 455/401 |
| 7,912,510 B2 * | 3/2011 | Park et al. | 455/567 |
| 2002/0115456 A1 * | 8/2002 | Narinen et al. | 455/466 |
| 2004/0092295 A1 * | 5/2004 | Yamada | 455/567 |
| 2007/0049306 A1 * | 3/2007 | Sekino et al. | 455/502 |
| 2007/0123311 A1 * | 5/2007 | Kim et al. | 455/567 |
| 2007/0172034 A1 * | 7/2007 | Jung | 379/1.01 |
| 2007/0189474 A1 * | 8/2007 | Cai | 379/142.01 |
| 2007/0224973 A1 * | 9/2007 | Park et al. | 455/412.2 |
| 2008/0025491 A1 * | 1/2008 | Park et al. | 379/207.16 |
| 2008/0026731 A1 * | 1/2008 | Park et al. | 455/414.1 |
| 2008/0043642 A1 * | 2/2008 | Park et al. | 370/259 |
| 2009/0196403 A1 * | 8/2009 | Park et al. | 379/87 |

FOREIGN PATENT DOCUMENTS

| | | |
|---|---|---|
| KR | 2006003746 A | 1/2006 |
| WO | WO2005043926 A2 | 5/2005 |
| WO | WO2006001681 A1 | 1/2006 |
| WO | WO2006001682 A2 | 1/2006 |
| WO | WO2006006801 A1 | 1/2006 |
| WO | WO2006009362 A1 | 1/2006 |

* cited by examiner

METHOD, SYSTEM AND APPARATUS FOR PROVIDING ALTERNATIVE MULTIMEDIA RING BACK TONE SUBSTITUTE SERVICE BY USING INTELLIGENT NETWORK

CROSS REFERENCE TO RELATED APPLICATION

This application claims the priority of Korean Patent Application No. 10-2006-0009337, filed on Jan. 31, 2006 in the Korean Intellectual Property Office, the disclosure of which are incorporated herein in their entirety by reference. Further, this application is the National Phase application of International Application No. PCT/KR2006/003476, filed Sept. 1, 2006, which designates the United States and was published in English. This application, in its entirety, is incorporated herein by reference.

TECHNICAL FIELD

The present invention relates to a method, a system, and an apparatus for providing a ringback tone alternative by using an intelligent network. More particularly, the present invention relates to a method, a system, and an apparatus for providing a sound source, which has been encoded by using an audio codec, as a ringback tone alternative having an improved quality by adaptively applying various audio codecs according to the service type so that, when a mobile communication terminal is provided with a ringback tone alternative by separately applying an audio codec and a voice codec to a ringback tone provision section and a voice communication section, respectively, it is unnecessary to individually and additionally change or modify a number of devices in a mobile communication network, but a specific device in an intelligent network controls other devices based on overall consideration of the ability of the mobile communication terminal, the type of the ringback tone alternative, etc.

BACKGROUND ART

As generally known in the art, various wireless communication services are provided via wireless communication networks in line with remarkable development of computers, electronics, and communication technologies. The most basic type of a wireless communication service is a voice communication service, which enables wireless voice communication among mobile communication subscribers using their mobile communication terminals regardless of time and place. A wireless data service has recently appeared and enabled mobile communication subscribers on the move to conduct data communication via wireless communication networks with no spatial restrictions.

Therefore, mobile communication subscribers can not only communicate with desired partners at any place and time based on the voice communication service, but also obtain various pieces of daily information (e.g. news, weather, sports, stocks, exchange rates, and traffic) in various types (e.g. texts, voices, and images) based on the wireless data service even on the move.

Meanwhile, a supplementary service for ringback tone alternative service has recently been developed and welcomed by mobile communication subscribers. This service replaces conventional monotonous ringback tones, which are in many cases simple and mechanical sounds (e.g. ringing sounds) generated during call connection and heard by the calling party, with various types of music (e.g. popular songs), recorded voices of the called or calling party, or other types of sounds (e.g. birds singing, water sounds, etc) according to the preference of the called or calling party.

As such, the ringback tone alternative service gives the calling party listening pleasure with various sound sources instead of boredom from monotonous and mechanical ringback tones.

In general, the ringback tone alternative service is available to mobile communication terminals in a mobile communication network based on a mobile communication system, such as CDMA (Code Division Multiple Access) 2000 system or WCDMA (Wideband CDMA) system.

When a mobile communication system provides such a ringback tone substitution service, it commonly uses a voice codec with a variable transmission rate, such as an EVRAC (Enhanced Variable Rate Codec) or an AMR (Adaptive Multiple Rate) codec, in order to improve the efficiency of voice communication and optimize the wireless channel. The voice codec is designed to maximize the channel efficiency so that it can detect speech and silent sections, create a suitable codebook, and provide a voice service at a minimum bit transmission rate by means of mapping.

However, such a voice codec with a variable transmission rate (e.g. EVRC or AMR codec) applies the same logic even for a sound source having few silent sections (e.g. music) and uses a codebook so as to encode the sound source. When a sound source (e.g. music) is mapped onto a voice codebook and coded, the sound source is encoded in conformity with human voice patterns. This means that various patterns appearing in the music are ignored during the encoding process. The resulting coding error degrades the quality of music. Therefore, the voice codec with a variable transmission rate is not suitable for encoding audio-type sound sources, such as music.

In an attempt to solve the problems of voice codecs with a variable transmission rate, it has been proposed and widely adopted in the industry to correct the light source. Particularly, a content provider, who provides sound sources, extracts a sound source from high-quality music (e.g. compact disk), modifies the sound source in conformity with a voice codec (e.g. EVRAC), and encodes the sound source so as to minimize damages to the sound source resulting from the voice codec.

This approach relies on preprocessing based on the characteristics of the EVRAC or manual operation of sound technicians. Although such operations may supplement the quality of EVRAC-based ringback tone alternatives up to the level of voice quality, they cannot provide high-quality ringback tone alternatives.

Meanwhile, it is most efficient to use an audio codec to encode a sound source and provide a ringback tone alternative. However, this requires that a number of technical problems be solved in advance.

Firstly, an audio codec adapted to the voice channel of mobile communication terminals should be used. For example, in the case of the CDMA 2000 system, a voice channel of 8 kbps is used and, in the case of the GSM (Global System for Mobile Communications), a voice channel of 12.3 kbps is used. As such, the audio codec must be modified and adapted to the transmission rate of the voice channel so as to provide ringback tone alternatives with improved quality.

Secondly, the service section needs to be divided into a ringback tone provision section and a voice communication section. An audio codec is used in the former section and a voice codec in the latter section so that a sound source is transmitted to a mobile communication terminal, which then decodes the sound source with a corresponding codec for playback.

Thirdly, a sound source suitable for the audio codec used in the mobile communication terminal and the mobile communication network must be fabricated and provided.

In summary, in order to provide high-quality ringback tone alternatives, it is inevitable to adapt the audio and voice codecs to the ringback tone provision and voice communication sections, respectively, for application to the sound source. In other words, the selection of a codec for a mobile communication network and mobile communication terminals must be based on the service type (e.g. ringback tone substitution service or voice communication service). However, no technology has yet been developed to provide the ringback tone substitution service in this manner.

Even when these technical problems are solved, additional modification or adaptation of various devices in the mobile communication network (e.g. exchangers, base stations, etc) would increase the time, labor, and cost necessary to provide the ringback tone substitution service. This increases the price of the service, affects its quality, and delays the development.

DISCLOSURE OF THE INVENTION

Therefore, the present invention has been made in view of the above-mentioned problems, and it is an object of the present invention to provide a method, a system, and an apparatus for providing a sound source, which has been encoded by using an audio codec, as a ringback tone alternative having an improved quality by adaptively applying various audio codecs according to the service type so that, when a mobile communication terminal is provided with a ringback tone alternative by separately applying an audio codec and a voice codec to a ringback tone provision section and a voice communication section, respectively, it is unnecessary to individually and additionally change or modify a number of devices in a mobile communication network, but a specific device in an intelligent network controls other devices based on overall consideration of the ability of the mobile communication terminal, the type of the ringback tone alternative, etc.

In order to accomplish this object, there is provided a method for providing a ringback tone alternative service for a calling mobile communication terminal requesting communication with a called mobile communication terminal in a mobile communication network having a caller-side wireless base station, a receiver-side wireless base station, a caller-side mobile communication exchange, a receiver-side mobile communication exchange, a home location register, a service control point, and a sound source providing device, the method comprising the steps of: (a) receiving a request for communication from the calling mobile communication terminal by the caller-side mobile communication exchange; (b) receiving a request for dealing with a ringback process from the receiver-side mobile communication exchange, the receiver-side mobile communication exchange having received a call setup request from the caller-side mobile communication exchange; (c) receiving detailed function information regarding the calling mobile communication terminal from the receiver-side mobile communication exchange to check whether or not the calling mobile communication terminal is capable of reproducing an audio codec sound source, the audio codec sound source being a ringback tone alternative sound source encoded with an audio codec; (d) performing call setup with the receiver-side mobile communication exchange and requesting to set the receiver-side mobile communication exchange as a bypass mode when it is determined at step (c) that the calling mobile communication terminal is capable of reproducing the audio codec sound source; (e) requesting the caller-side mobile communication exchange to set the caller-side mobile communication exchange as the bypass mode by the receiver-side mobile communication exchange; and (f) transmitting the audio codec sound source from the sound source providing device to the calling mobile communication terminal.

According to another aspect of the present invention, there is provided a system for providing a ringback tone alternative service to a calling mobile communication terminal attempting a call connection to a called mobile communication terminal, the system comprising: a home location register for storing information regarding location and capability of the calling mobile communication terminal and the called mobile communication terminal, information regarding whether the called mobile communication terminal is subscribed to the ringback tone alternative service, and information on routing; a sound source providing device for storing sound sources and providing the calling mobile communication terminal with the sound sources, the sound sources including an audio codec sound source encoded with an audio codec; a caller-side wireless base station for receiving and transmitting a request for call connection from the calling mobile communication terminal, selecting a bypass mode and transmitting the audio codec sound source to the calling mobile communication terminal in the bypass mode; a caller-side mobile communication exchange for receiving a request for selection of the bypass mode and controlling the caller-side wireless base station to select the bypass mode, relaying the audio codec sound source to the calling mobile communication terminal by using the caller-side wireless base station after receiving the audio codec sound source; a receiver-side mobile communication exchange for checking whether the called mobile communication terminal is subscribed to the ringback tone alternative service, requesting to deal with a ringback tone process, collecting detailed function information regarding the calling mobile communication terminal, creating the detailed function information, transferring the detailed function information, forwarding a request for selection of the bypass mode to the caller-side mobile communication exchange, receiving the audio codec sound source from the sound source providing device, and transmitting the audio codec sound source to the caller-side mobile communication exchange; and a service control point for receiving a request for dealing with a ringback tone process from the receiver-side mobile communication exchange, receiving the detailed function information to check whether the calling mobile communication terminal is capable of reproducing the audio codec sound source and requesting the receiver-side mobile communication exchange to connect a call to the sound source providing device, and requesting selection of the bypass mode.

According to another aspect of the present invention, there is provided an apparatus for providing a ringback tone alternative service in a mobile communication network for providing the ringback tone alternative service to a calling mobile communication terminal attempting a call connection to a called mobile communication terminal, the apparatus performing functions of receiving a request to deal with a ringback tone process from a receiver-side mobile communication exchange administrating the called mobile communication terminal, receiving detailed function information regarding the calling mobile communication terminal to check whether the calling mobile communication terminal is capable of reproducing an audio codec sound source, the audio codec sound source being a ringback tone alternative sound source encoded with an audio codec, requesting the receiver-side mobile communication exchange to select a bypass mode, and controlling the mobile communication network to transmit the audio codec sound source to the calling mobile communication terminal in the bypass mode.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
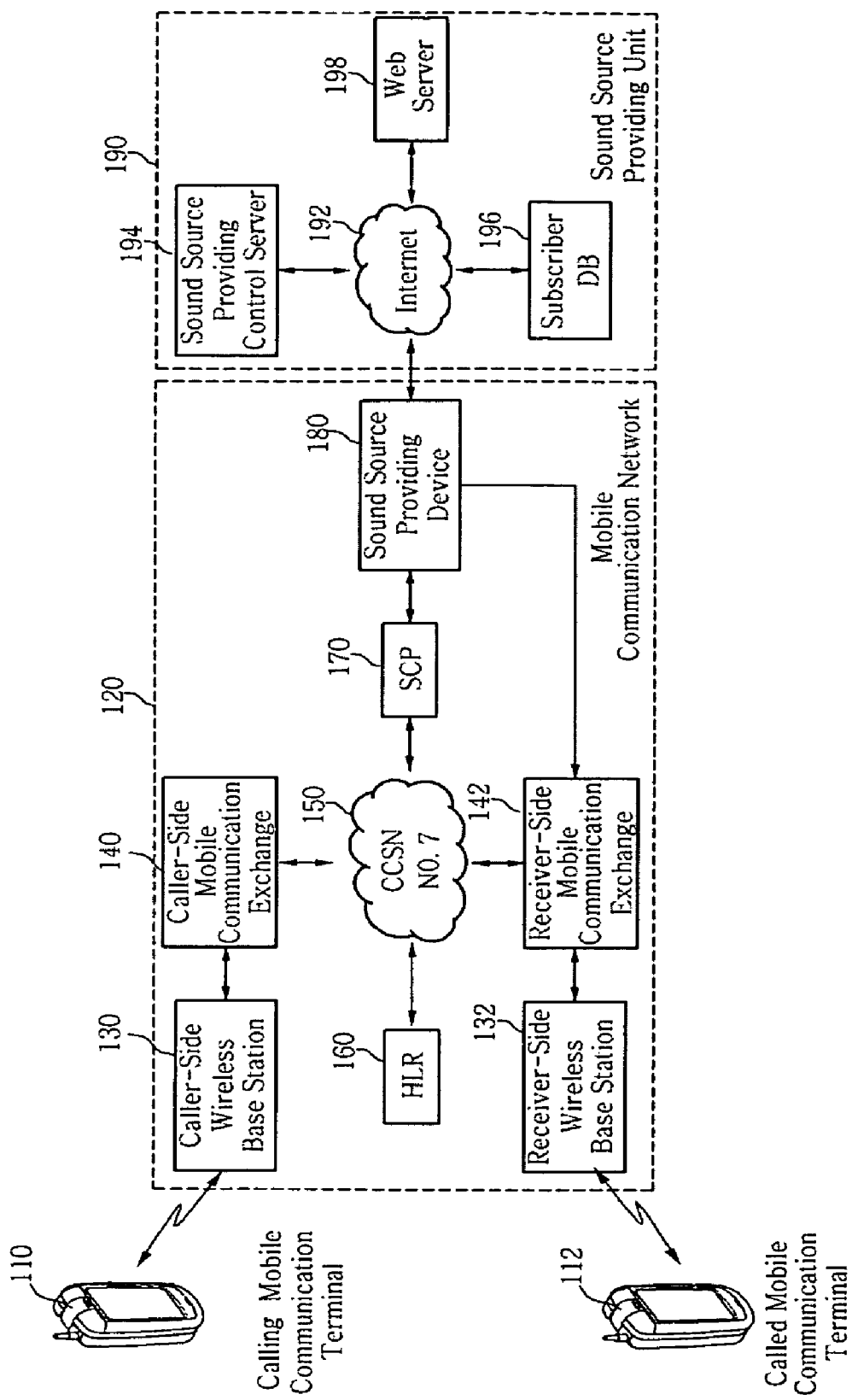
FIG. 1 is a block diagram showing the brief construction of a system for providing a ringback tone alternative by using an intelligent network according to a preferred embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted. In addition, a detailed description of known functions and configurations incorporated herein is omitted to avoid making the subject matter of the present invention unclear.

It will be assumed in the following description that CDMA 2000 system is used as a mobile communication network for realizing a mobile communication network. However, this assumption is for the purpose of description, and the idea of the present invention is thus applicable to other types of synchronous or asynchronous mobile communication systems without being limited to that assumption.

FIG. 1 is a block diagram showing the brief construction of a system for providing a ringback tone alternative by using an intelligent network according to a preferred embodiment of the present invention.

The inventive system for providing a ringback tone alternative by using an intelligent network includes a calling mobile communication terminal 110, a called mobile communication terminal 112, a mobile communication network 120, and a sound source providing unit 190.

Herein, the ringback tone alternative is the audible and/or visible ringback signal that is heard and/or seen on the communication line/terminal by the calling party after dialing and prior to the call being answered at the receiver party.

The calling mobile communication terminal 110 and the called mobile communication terminal 112 are operable to provide voice communication with each other via the mobile communication network 120 or with conventional wired telephones also via a public switched telephone network (not shown). The mobile communication terminals may be PDAs (Personal Digital Assistants), cellular phones, PCS (Personal Communication Service) phones, handheld PCs, GSM (Global System for Mobile) phones, WCDMA (Wideband CDMA) phones, CDMA-2000 phones, or MBS (Mobile Broadband System) phones which are expected to be used in the 4$^{th}$ generation system currently under discussion.

According to a preferred embodiment of the present invention, the calling mobile communication terminal 110 transmits a voice communication request to the called mobile communication terminal 112 of a called party via the mobile communication network 120 based on a calling party's keypad operation. When the called party has been subscribed to a ringback tone substitution service for the called mobile communication terminal 112, the calling mobile communication terminal 110 receives a ringback tone alternative from the mobile communication terminal 120 and reproduces it.

More Particularly, if and when the calling mobile communication terminal 110 transmits a voice communication request to the called mobile communication terminal 112 and then receives a ringback tone alternative from the mobile communication network 120, and it is assumed that the sound source of the ringback tone alternative is encoded by an audio codec, the calling mobile communication terminal 110 should replace its basic codec with the audio codec upon receiving a signaling message requesting such replacement. Then, the calling mobile communication terminal 110 decodes the sound source received from the mobile communication network 120 with the audio codec and reproduces it.

When the calling mobile communication terminal 110 receives a signaling message requesting that the basic codec be replaced with a voice codec, the calling mobile communication terminal 110 conducts the replacement and then supports voice communication by using the voice codec.

The called mobile communication terminal 112 is operable to receive a communication request from the calling mobile communication terminal 10 and respond to a paging request of the mobile communication network 120.

The mobile communication network 120 includes a caller-side wireless base station 130; a receiver-side wireless base station 132; a caller-side mobile communication exchange 140; a receiver-side mobile communication exchange 142; a CCSN (Common Channel Signaling Network) No. 7 150; an HLR (Home Location Register) 160; an SCP (Service Control Point) 170; and a sound source providing device 180, so as to provide the calling and called mobile communication terminals 110 and 112 with a voice communication service and a ringback tone substitution service.

Each of the caller-side and receiver-side wireless base stations 130 and 132 includes a base station transmission system and a base station controller.

According to a preferred embodiment of the present invention, when the caller-side wireless base station 130 receives a call request from the calling mobile communication terminal 110, it establishes a communication path between the calling mobile communication terminal 110 and the caller-side mobile communication exchange 140. Upon receiving a request for a "bypass mode" from the caller-side mobile communication exchange 140, the caller-side wireless base station 130 switches itself to the bypass mode and relays an audio codec sound source which is encoded by an audio codec as a ringback tone alternative, from the caller-side mobile communication exchange 140 to the calling mobile communication terminal 110 without going through a vocoder.

When requested by the caller-side mobile communication exchange 140 to cancel the bypass mode, the caller-side wireless base station 130 cancels the bypass mode and performs vocoding of a voice call for voice communication by using the vocoder, and relays the request to the calling mobile communication terminal 110.

The caller-side and receiver-side mobile communication exchanges 140 and 142 are operable to deal with bearer and supplementary services, call processing of incoming and outgoing calls, and location registration and handoff procedures, as well as interworking with another network. Particularly, each of the caller-side and receiver-side mobile communication exchanges 140 and 142 have access to the HLR 160 in order to obtain information regarding the calling and called parties who are mobile communication subscribers of the calling and called mobile communication terminals 110 and 112, respectively, as well as information regarding the location and condition of respective mobile communication terminals.

When the caller-side mobile communication exchange 140 receives a call request for voice communication from the calling mobile communication terminal 110, the caller-side mobile communication exchange 140 consults the HLR 160 to identify the receiver-side mobile communication exchange 142 and transmits an initial address message that contains the telephone number of the calling mobile communication terminal 110, to the receiver-side mobile communication exchange 142 for call setup. When the caller-side mobile communication exchange 140 receives an address termination message, which requests selection of the bypass mode, from the receiver-side mobile communication exchange 142, the caller-side mobile communication exchange 140 controls the caller-side wireless base station 130 to switch over to the bypass mode. Then, the caller-side mobile communication exchange 140 transmits a signaling message to the calling mobile communication terminal 110 and controls it to switch from the audio codec to the basic codec.

When the caller-side mobile communication exchange 140 receives an audio codec sound source from the sound source providing device 180 via the receiver-side mobile communication exchange 142, the caller-side mobile communication exchange 140 transmits the audio codec sound source to the calling mobile communication terminal 110 via the caller-side wireless base station 130 in the bypass mode. Upon receiving a response message from the receiver-side mobile communication exchange 142, which requests cancellation of the bypass mode, the caller-side mobile communication exchange 140 controls the caller-side wireless base station 130 to cancel the bypass mode and controls the calling mobile communication terminal 110 to switch over from the voice codec to the basic codec.

When the receiver-side mobile communication exchange 142 receives an initial address message from the caller-side mobile communication exchange 140, the receiver-side mobile communication exchange 142 obtains supplementary service information regarding the called mobile communication terminal 112 from the HLR 160 so as to check whether or not the called mobile communication terminal 112 is subscribed to the ringback tone substitution service. Then, the receiver-side mobile communication exchange 142 requests the SCP 170 to deal with the ringback tone substitution service is processed. The receiver-side mobile communication exchange 142 also transmits information on the capability of the calling mobile communication terminal 110, the information being necessary to determine whether or not the calling mobile communication terminal 110 can accommodate a ringback tone alternative (i.e. detailed function information), to the SCP 170. When the receiver-side mobile communication exchange 142 receives a request for a call connection to the sound source providing server, i.e. a request for selection of the bypass mode, the caller-side mobile communication exchange 142 establishes a call with the sound source providing device 180 and notifies the caller-side mobile communication exchange 140 of the result.

Upon receiving an audio codec sound source from the sound source providing device 180, the receiver-side mobile communication exchange 142 relays it to the caller-side mobile communication exchange 140. Then, the receiver-side mobile communication exchange 142 pages the called mobile communication terminal 112 and, after receiving a response, cancels the call connection with the sound source providing device 180 under the control of the SCP 170. In addition, the receiver-side mobile communication exchange 142 notifies the caller-side mobile communication exchange 140 that the called mobile communication terminal 112 has responded and requests it to canceling of the bypass mode.

The CCSN No. 7 150 is comprised of signaling points and signaling links so as to provide a common channel signaling scheme standardized by ITU-T No. 7 scheme. As used herein, the common channel signaling regime refers to a signaling scheme for separating the signaling information and network management information into voice and data so that they are transmitted via a separate channel.

The HLR 160 has a database storing service profiles related to subscription information of mobile communication subscribers. Among others, the HLR 160 deals with the registration of the mobile communication terminals, deletion of the registration, and position determination of the terminals. In addition, the HLR 160 stores the telephone number of mobile communication subscribers using respective mobile communication terminals, MIN (Mobile Identification Number), ESN (Electronic Serial Number), information regarding the service type (i.e. whether or not the ringback tone substitution service has been subscribed to); information necessary for routing to the sound source providing device 180, information regarding the capability of the mobile communication terminals, etc.

The SCP 170 is operable to perform core functions necessary to provide various supplementary services based on an intelligent network. The SCP 170 consists largely of a data system and software programs for controlling the supplementary services storing information on subscribers for each service.

In particular, the SCP 170 stores data regarding the type of the ringback tone alternative sound source with regard to the called mobile communication terminal 112, more particularly, information on whether the sound source is an audio codec sound source encoded by an audio codec or a conventional alternative sound source encoded by a voice codec, as well as information regarding the file of the ringback tone alternative sound source. In addition, the SCP 170 performs testing and interpretation of the eligibility of supplementary services received from the receiver-side mobile communication exchange 142.

When the inventive SCP 170 is requested by the receiver-side mobile communication exchange 142 to process the ringback tone substitution service, the SCP 170 obtains information on the type of the ringback tone alternative sound source designated to the called mobile communication terminal 110 and requests an initial call connection while transmitting routing information regarding the sound source providing device 180. Upon receiving detailed function information, the SCP 170 checks whether or not the calling mobile communication terminal 110 is capable of reproducing the audio codec sound source and transmits a call connection request to the sound providing device 180. The SCP 170 requests the receiver-side mobile communication exchange 142 to instruct the caller-side mobile communication exchange 140 to select the bypass mode.

When the sound source providing device 180 requests to the SCP 170 to provide sound source information, i.e. information regarding the ringback tone alternative determined with respect to the called mobile communication terminal 110, the SCP 170 transmits the requested information.

The SCP 170 requests the receiver-side mobile communication exchange 142 to set up a response trigger detection point and, when the receiver-side mobile communication exchange 142 requests service processing regarding the termination of the ringback tone substitution service, the SCP 170 requests the receiver-side mobile communication exchange 142 to disconnect the call connection with the sound source providing device 180.

The sound source providing device 180 is an intelligent network IP for storing ringback tone alternative sound sources. At a request for a ringback tone alternative sound source, the sound source providing device 180 transmits a sound source authentication request to a sound source providing control server 194 and, when the authentication is successful, transmits a ringback tone alternative sound source to the receiver-side mobile communication exchange 142. When a ringback tone alternative sound source is received from a web server 198, the sound source providing device 180 stores it.

The sound source providing device 180 performs call setup with the receiver-side mobile communication exchange 142. When requested to provide a ringback tone alternative sound source for the called mobile communication terminal 112 (i.e. audio codec sound source), the sound source providing device 180 requests the SCP 170 to provide information regarding the corresponding sound source, receives the information, searches for the audio codec sound source, and transmits it to the receiver-side mobile communication exchange 142.

The sound source providing unit 190, including Internet 192, a sound source providing control server 194, a subscriber DB 196, and a web server 198, creates or receives ringback tone alternatives, encodes them by an audio codec or a voice codec, and provides them for the sound source providing device 180.

The Internet 192 refers to a global open-type computer network structure providing TCP/IP protocol and various services residing on the upper layers thereof, e.g., HTTP (Hypertext Transfer Protocol), Telnet, FTP (File Transfer Protocol), DNS (Domain Name Server), SMTP (Simple Mail Transfer Protocol), SNTP (Simple Network Management Protocol), NFS (Network File Service), and NIS (Network Information Service).

The sound source providing control server 194 is operable to manage the provision of ringback tone alternatives. Particularly, it controls the sound source providing device 180 and the user DB so as to authenticate sound sources based on information regarding the calling and called parties of the calling and called mobile communication terminals 110 and 112, call request time, etc.

The subscriber DB 196 is adapted to store and manage information regarding subscribers of the ringback tone substitution service. The subscriber DB 196 provides subscriber information used to authenticate sound sources by the sound source providing control server 194.

The web server 198, coupled to the sound source providing device 180 and the sound source providing control server 194 via Internet 192, adds ringback tone alternatives to the sound source providing device 180. In addition, it provides user terminals with a user interface so that the sound source providing control server 194 can determine and modify information necessary to specify a sound source, i.e. information regarding the calling party, calling party group, calling time, etc, as well as a sound source code corresponding to that information. To this end, the web server 198 provides the user terminals or mobile communication terminals with web pages or WAP pages.

Figure 2A:
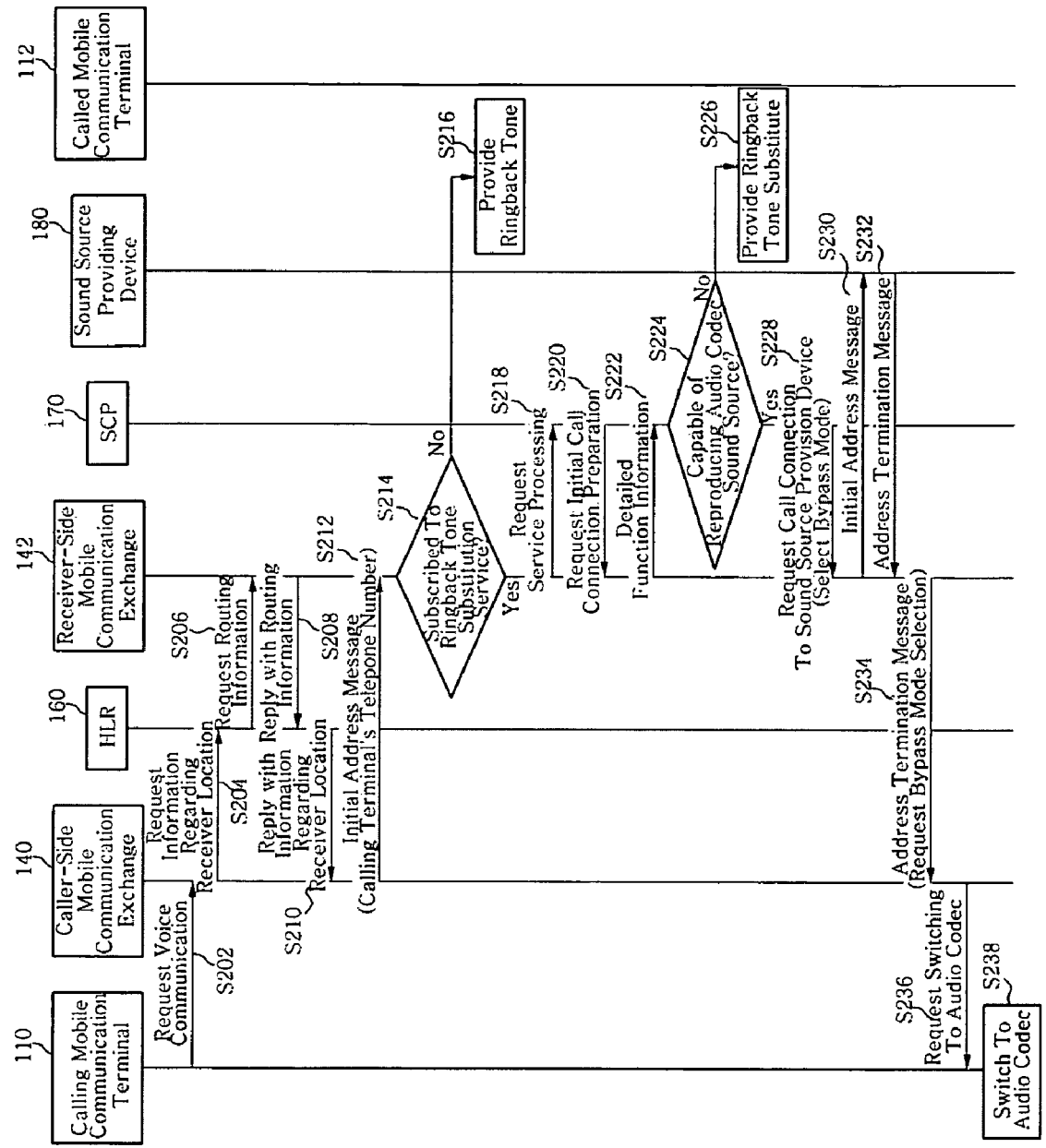
FIGS. 2a and 2b are flowcharts showing the first and second halves of a method for providing a ringback tone alternative by using an intelligent network according to a preferred embodiment of the present invention, respectively.
Figure 2B:
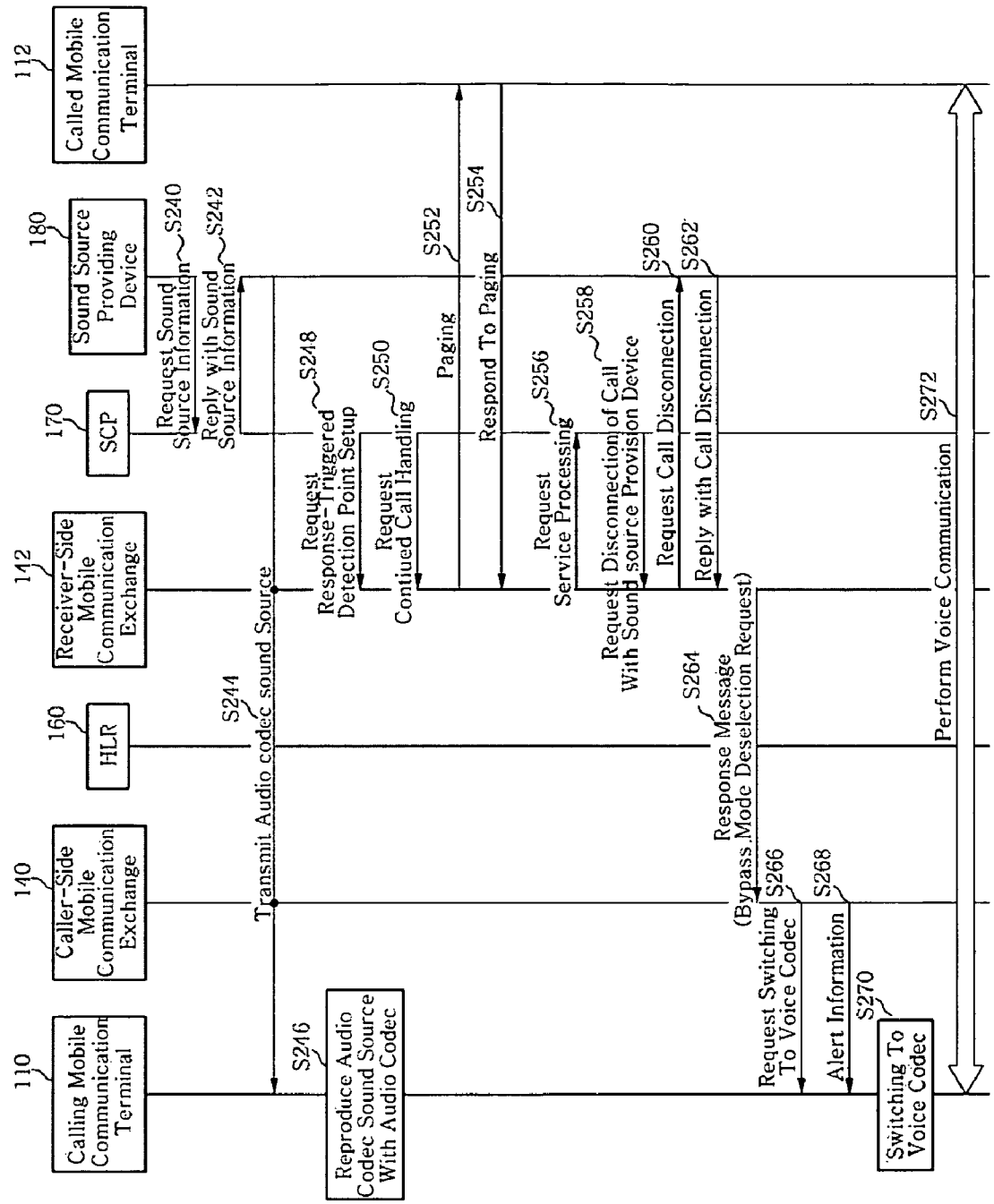

FIGS. 2a and 2b are flowcharts showing the first and second halves of a method for providing a ringback tone alternative by using an intelligent network according to a preferred embodiment of the present invention, respectively.

The inventive method for providing a ringback tone alternative by using an intelligent network will now be described on an assumption that the system described with reference to FIG. 1 is used to implement the method.

For voice communication with the called party, the calling party operates the calling mobile communication terminal 110 to input the telephone number of the called mobile communication terminal 110 and select "SEND". Then, the calling mobile communication terminal 110 transmits a voice communication request to the caller-side mobile communication exchange 140 via the caller-side wireless base station 130 (S202).

Upon receiving the voice communication request, the caller-side mobile communication exchange 140 sends the telephone number of the called mobile communication terminal 112 to the HLR 160 to request information regarding the location of the called mobile communication terminal 112 (S204). The HLR 170 locates the called mobile communication terminal 112, identifies the receiver-side mobile communication exchange 142, and requests routing information (S206). The receiver-side mobile communication exchange 142 responds to the request by transmitting its routing information to the HLR 160 (S208). The HLR 160 receives the routing information and transmits it to the caller-side mobile communication exchange 140 so as to respond to the request for information regarding the location of the called mobile communication terminal 112 (S210).

Upon obtaining information regarding the location of the called mobile communication terminal 112, i.e. routing information regarding the receiver-side mobile communication exchange 142, the caller-side mobile communication exchange 140 transmits an initial address message containing the telephone number of the calling mobile communication terminal 110, to the receiver-side mobile communication exchange 142 to attempt a call connection to the receiver-side mobile communication exchange 142 (S212).

After receiving the initial address message, the receiver-side mobile communication exchange 142 checks if the called mobile communication terminal 112 is subscribed to the ringback tone substitution service by using the HLR 160 (S214). If not, the receiver-side mobile communication exchange 142 provides the calling mobile communication terminal 110 with a conventional ringback tone (S216). If it is determined that the called mobile communication terminal 112 is subscribed to the ringback tone substitution service, the receiver-side mobile communication exchange 142 transmits the telephone number of the calling mobile communication terminal 110 and that of the called mobile communication terminal 112 to the SCP 170 and requests service processing, in order to provide the ringback tone alternative (S218). The step (S216) of providing a conventional ringback tone substitution service is widely known in the art, and detailed description thereof will be omitted herein.

After receiving the service processing request from the receiver-side mobile communication exchange 142, the SCP 170 checks whether the ringback tone alternative sound source determined with regard to the called mobile communication terminal 112 is an audio codec sound source, which has been encoded by using an audio codec. That is, the SCP 170 checks if a ringback tone alternative has been requested or not and requests the receiver-side mobile communication exchange 142 to prepare for an initial call connection (S220).

At the request for initial call connection preparation, the receiver-side mobile communication exchange 142 collects information on the capability of the calling mobile communication terminal 110, i.e. information regarding whether or not the calling mobile communication terminal 110 can reproduce the audio codec sound source (detailed function information) and transmits it to the SCP 170 (S222).

After receiving the detailed function information, the SCP 170 analyzes it and checks whether the calling mobile communication terminal 110 can play the audio codec sound source (S224). If not, the SCP 170 provides the calling mobile communication terminal 110 with a conventional ringback tone alternative (S226). If it is determined that the calling mobile communication terminal 110 can play the audio codec sound source, the SCP 170 requests the receiver-side mobile communication exchange 142 to make a call connection with the sound source providing device 180 (S228). The SCP 170 controls the receiver-side mobile communication exchange 142 to request the caller-side mobile communication exchange 140 to select the bypass mode.

The receiver-side mobile communication exchange 142 transmits an initial address message to attempt a call connection with the sound source providing device 180 as requested (S230). Upon receiving an address termination message from the sound source providing device 180, the receiver-side mobile communication exchange 142 finishes the call connection procedure (S232).

Following this, the receiver-side mobile communication exchange 142 transmits an address termination message to the caller-side mobile communication exchange 140. Then, the receiver-side mobile communication exchange 142 requests the caller-side mobile communication exchange 140 to select the bypass mode (S234).

As requested by the receiver-side mobile communication exchange 142, the caller-side mobile communication exchange 140 requests the caller-side wireless base station 130 to select the bypass mode, although not shown in the drawings, so that the caller-side wireless base station 130 transmits it to the calling mobile communication terminal 110 in the bypass mode, i.e. without going through a vocoder when an audio codec sound source is received. In addition, the caller-side mobile communication exchange 140 transmits a signaling message (e.g. data burst message) to the calling mobile communication terminal 110 to allow it to switch from the basic codec to the audio codec (S236). The calling mobile communication terminal 110 switches itself from the basic codec to the audio codec as requested (S238).

Upon completing the call setup with the receiver-side mobile communication exchange 142, the sound source providing device 180 requests the SCP 170 to provide sound source information, which is related to the ringback tone alternative sound source determined with regard to the called mobile communication terminal 110, i.e. information regarding the audio codec sound source (S240). The SCP 170 retrieves the corresponding sound source information and transmits it to the sound source providing device 180 (S242).

After receiving the sound source information, the sound source providing device 180 searches for the audio codec sound source, which is designated by the sound source information, from a number of stored sound sources and transmits it to the receiver-side mobile communication exchange 142, which transfers it to the caller-side mobile communication exchange 140. Then, the caller-side mobile communication exchange 140 transmits the audio codec sound source to the calling mobile communication terminal 110 via the caller-side wireless base station 130 (S244). After receiving the audio codec sound source, the calling mobile communication terminal 110 reproduces it with the audio codec (selected in step S238) as a high-quality ringback tone alternative (S246).

After transmitting the sound source information to the sound source providing device 180 in step S242, the SCP 170 requests the receiver-side mobile communication exchange 142 to set up a response trigger detection point (S248) and to continue the call processing (S250). The receiver-side mobile communication exchange 142 pages the called mobile communication terminal 112 and informs that it is being called by the calling mobile communication terminal 110 (S252). At the paging request, the called mobile communication terminal 112 informs the called party of the call in various manners (e.g. bell, vibration). When the called party notices the call and presses a specific key button, for example, as a response, the called mobile communication terminal 112 transmits the response to the call to the receiver-side mobile communication exchange 142 (S254).

After that, the receiver-side mobile communication exchange 142 requests the SCP 170 to conduct a processing of notifying the ringback tone alternative is terminated, (S256). The SCP 170 requests the receiver-side mobile communication exchange 142 to disconnect the connection with the sound source providing device 180 (S258). Then, the receiver-side mobile communication exchange 142 requests the sound source providing device 180 to disconnect the connection (S260). Accordingly, the sound source providing device 180 disconnects the call with the receiver-side mobile communication exchange 142 (S262).

After the connection with the SCP 170 is dropped, the receiver-side mobile communication exchange 142 transmits a response message to the caller-side mobile communication exchange 140 and informs that the called mobile communication terminal 112 has responded. In addition, the receiver-side mobile communication exchange 142 requests that the bypass mode, selection of which has been requested in step S234, be canceled (S264).

After receiving the response message, the caller-side mobile communication exchange 140 controls the caller-side wireless base station 130 to cancel the bypass mode. The caller-side mobile communication exchange 140 transmits a signaling message to the calling mobile communication terminal 110 and controls it to switch over from the basic codec to the voice codec (S266). The caller-side mobile communication exchange 140 transmits alert information to the calling mobile communication terminal 110 (S268) and notifies that the called mobile communication terminal 112 has responded. The calling mobile communication terminal 110 analyzes the signaling message received at step S266 and switches from the basic codec to the voice codec (S270).

Then, a voice communication channel is established in line between the calling mobile communication terminal 110, the caller-side mobile communication exchange 140, the receiver-side mobile communication exchange 142, and the called mobile communication terminal 112 so that voice communication is conducted between the calling and called mobile communication terminals 110 and 112 (S272).

As such, the mobile communication network 120 differentiates the ringback alternative provision section from the voice communication service section and adaptively applies a codec to provide the mobile communication terminal with a high-quality ringback tone alternative. The mobile communication terminal has an audio codec used to decode the ringback tone alternative and play it, and a voice codec used to decode voice communication and play it, so that the high-quality ringback tone substitution and voice communication services can be provided.

In addition, an intelligent network, particularly SCP 170 is used to provide a high-quality ringback tone substitution service while minimizing the modification or adaptation of other devices of the existing mobile communication network 120, such as the caller-side and receiver-side mobile communication exchanges 140 and 142.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

As described in the foregoing, the present invention is advantageous in that the mobile communication business provider differentiates the ringback alternative provision section from the voice communication service section and adaptively modifies the codec so as to provide the mobile communication terminal with a high-quality ringback tone alternative. This in turn enhances customer service.

The mobile communication terminal has an audio codec used to decode the ringback tone alternative and play it, and a voice codec used to decode voice communication and play it, so that the high quality ringback tone substitution and voice communication services can be provided. As a result, the mobile communication subscribers may surely feel the improvement in service quality.

Furthermore, an intelligent network is used to provide the high-quality ringback tone substitution service while minimizing the modification or adaptation of other devices of the existing mobile communication network, such as the caller-side and receiver-side mobile communication exchanges. This reduces the cost for providing it.

The invention claimed is:

1. A method for providing a ringback tone alternative service for a calling mobile communication terminal requesting communication with a called mobile communication terminal in a mobile communication network having a caller-side wireless base station, a receiver-side wireless base station, a caller-side mobile communication exchange, a receiver-side mobile communication exchange, a home location register, a service control point, and a sound source providing device, the method comprising the steps of:
   (a) receiving a request for communication from the calling mobile communication terminal by the caller-side mobile communication exchange;
   (b) receiving a request for dealing with a ringback tone process from the receiver-side mobile communication exchange, the receiver-side mobile communication exchange having received a call setup request from the caller-side mobile communication exchange;
   (c) receiving detailed function information regarding the calling mobile communication terminal from the receiver-side mobile communication exchange to check whether or not the calling mobile communication terminal is capable of reproducing an audio codec sound source, the audio codec sound source being a ringback tone alternative sound source encoded with an audio codec;
   (d) performing call setup with the receiver-side mobile communication exchange and requesting to set the receiver-side mobile communication exchange as a bypass mode when it is determined at step (c) that the calling mobile communication terminal is capable of reproducing the audio codec sound source;
   (e) requesting the caller-side mobile communication exchange to set the caller-side mobile communication exchange as the bypass mode by the receiver-side mobile communication exchange; and
   (f) transmitting the audio codec sound source from the sound source providing device to the calling mobile communication terminal.

2. The method as claimed in claim 1, wherein step (b) includes the steps of:
   (b1) receiving the call setup request from the caller-side mobile communication exchange by using the receiver-side mobile communication exchange;
   (b2) checking whether or not the called mobile communication terminal has subscribed to the ringback tone alternative service by using the receiver-side mobile communication exchange; and
   (b3) requesting the service control point to deal with the ringback tone process by the receiver-side mobile communication exchange when it is determined at step (b2) that the called mobile communication terminal is subscribed to the ringback tone alternative service.

3. The method as claimed in claim 2, further including the step of (b4) providing the calling mobile communication terminal with a ringback tone when it is determined at step (b2) that the called mobile communication terminal is not subscribed to the ringback tone alternative service, following step (b3).

4. The method as claimed in claim 1, further comprising the step of (d1) controlling the sound source providing device to transmit a ringback tone alternative, the ringback tone alternative being encoded with a voice codec, to the calling mobile communication terminal by the service control point if it determined at step (d) that the calling mobile communication terminal is unable to reproduce the audio codec sound source, following step (d).

5. The method as claimed in claim 1, further comprising the step of (e1) controlling the calling mobile communication terminal to select the audio codec as a default codec after step (e).

6. The method as claimed in claim 1, wherein step (f) includes the steps of:
   (f1) requesting the service control point to provide sound source information regarding the audio codec sound source and receiving the sound source information; and
   (f2) analyzing the sound source information, identifying the audio codec sound source, searching for the audio codec sound source, and transmitting the audio codec sound source to the calling mobile communication terminal.

7. The method as claimed in claim 1, further comprising the step of (g) decoding and reproducing the audio codec sound source by using the audio codec in the calling mobile communication terminal after step (f).

8. The method as claimed in claim 1, further comprising, after step (f), the steps of:
   (h) requesting the receiver-side mobile communication exchange to set up a response trigger detection point and to continue call handling;
   (i) paging the called mobile communication terminal by the receiver-side mobile communication exchange;
   (j) receiving a response to the paging of step (i) from the called mobile communication terminal by the receiver-side mobile communication exchange;

(k) controlling the receiver-side mobile communication exchange to disconnect call setup with the sound source providing device by the service control point;

(l) controlling the caller-side mobile communication exchange to cancel the bypass mode by the receiver-side mobile communication exchange; and (m) notifying the calling mobile communication terminal by the caller-side mobile communication exchange that the called mobile communication terminal has answered.

9. The method as claimed in claim 8, further comprising the step of (11) controlling the calling mobile communication terminal to select a voice codec as a default codec by the caller-side mobile communication exchange, after step (1).

10. The method as claimed in claim 9, further comprising the step of (n) performing the communication with the called mobile communication terminal based on the voice codec by the calling mobile communication terminal.

11. A system for providing a ringback tone alternative service to a calling mobile communication terminal attempting a call connection to a called mobile communication terminal, the system comprising:

a home location register for storing information regarding location and capability of the calling mobile communication terminal and the called mobile communication terminal, information regarding whether the called mobile communication terminal is subscribed to the ringback tone alternative service, and information on routing;

a sound source providing device for storing sound sources and providing the calling mobile communication terminal with the sound sources, the sound sources including an audio codec sound source encoded with an audio codec;

a caller-side wireless base station for receiving and transmitting a request for call connection from the calling mobile communication terminal, selecting a bypass mode and transmitting the audio codec sound source to the calling mobile communication terminal in the bypass mode;

a caller-side mobile communication exchange for receiving a request for selection of the bypass mode and controlling the caller-side wireless base station to select the bypass mode, and relaying the audio codec sound source to the calling mobile communication terminal by using the caller-side wireless base station after receiving the audio codec sound source;

a receiver-side mobile communication exchange for checking whether the called mobile communication terminal is subscribed to the ringback tone alternative service, requesting to deal with a ringback tone process, collecting detailed function information regarding the calling mobile communication terminal, creating the detailed function information, transferring the detailed function information, forwarding a request for selection of the bypass mode to the caller-side mobile communication exchange, receiving the audio codec sound source from the sound source providing device, and transmitting the audio codec sound source to the caller-side mobile communication exchange; and a service control point for receiving a request for dealing with the ringback tone process from the receiver-side mobile communication exchange, receiving the detailed function information to check whether the calling mobile communication terminal is capable of reproducing the audio codec sound source and requesting the receiver-side mobile communication exchange to connect a call to the sound source providing device, and requesting selection of the bypass mode.

12. The system as claimed in claim 11, wherein the service control point is operable to receive a request for sound source information regarding the audio codec sound source determined with regard to the called mobile communication terminal from the sound source providing device and transmit the sound source information to the sound source providing device.

13. The system as claimed in claim 11, wherein the service control point is operable to control the sound source providing device to provide the calling mobile communication terminal with a ringback tone alternative sound source encoded with a voice codec when the calling mobile communication terminal is unable to reproduce the audio codec sound source.

14. The system as claimed in claim 11, wherein the service control point is operable to request the receiver-side mobile communication exchange to set up a response trigger detection point and continue a call handling.

15. The system as claimed in claim 14, wherein the receiver-side mobile communication exchange is operable to page the called mobile communication terminal and, when the called mobile communication terminal responds to paging, request the service control point to terminate the ringback tone alternative service.

16. The system as claimed in claim 15, wherein the service control point is operable to control the receiver-side mobile communication exchange to drop call setup with the sound source providing device.

17. The system as claimed in claim 16, wherein the receiver-side mobile communication exchange is operable to control the caller-side mobile communication exchange to cancel the bypass mode, and the calling mobile communication terminal is operable to control the caller-side wireless base station to cancel the bypass mode.

18. The system as claimed in claim 11, wherein the caller-side mobile communication exchange is operable to control the calling mobile communication terminal to select the audio codec as a default codec.

19. The system as claimed in claim 17, wherein the caller-side mobile communication exchange is operable to control the calling mobile communication terminal to select a voice codec as a default codec.

20. The system as claimed in claim 18, wherein the calling mobile communication terminal is operable to reproduce the audio codec sound source with the audio codec.

21. The system as claimed in claim 19, wherein the calling mobile communication terminal is operable to communicate with the called mobile communication terminal based on the voice codec.

22. An apparatus for providing a ringback tone alternative service in a mobile communication network for providing the ringback tone alternative service to a calling mobile communication terminal attempting a call connection to a called mobile communication terminal, the apparatus comprising a processor configured for performing functions of receiving a request to deal with a ringback tone process from a receiver-side mobile communication exchange administrating the called mobile communication terminal, receiving detailed function information regarding the calling mobile communication terminal to check whether the calling mobile communication terminal is capable of reproducing an audio codec sound source, the audio codec sound source being a ringback tone alternative sound source encoded with an audio codec, requesting the receiver-side mobile communication exchange to instruct a caller-side mobile communication exchange to select a bypass mode, and controlling the mobile communication network to transmit the audio codec sound source to the calling mobile communication terminal in the bypass mode.

23. The apparatus as claimed in claim 22, wherein the processor further performs a function of controlling the mobile communication network to transmit a ringback tone alternative sound source encoded with a voice codec to the calling mobile communication terminal when the calling mobile communication terminal is unable to reproduce the audio codec.

* * * * *